(12) United States Patent  (10) Patent No.: US 11,977,980 B2
Takahashi et al.  (45) Date of Patent: May 7, 2024

(54) INFORMATION PROCESSING METHOD AND INFORMATION PROCESSING SYSTEM

(71) Applicant: Panasonic Intellectual Property Management Co., Ltd., Osaka (JP)

(72) Inventors: Masaki Takahashi, Osaka (JP); Kazunobu Ishikawa, Osaka (JP); Yusuke Tsukamoto, Osaka (JP); Shota Onishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 346 days.

(21) Appl. No.: 17/398,168

(22) Filed: Aug. 10, 2021

(65) Prior Publication Data

US 2021/0365731 A1  Nov. 25, 2021

Related U.S. Application Data

(63) Continuation of application No. PCT/JP2019/046123, filed on Nov. 26, 2019.

(30) Foreign Application Priority Data

Apr. 4, 2019 (JP) ................... 2019-072242

(51) Int. Cl.
*G06N 3/08* (2023.01)
*G06F 18/21* (2023.01)
(Continued)

(52) U.S. Cl.
CPC ............. *G06N 3/08* (2013.01); *G06F 18/214* (2023.01); *G06F 18/217* (2023.01); *G06N 20/00* (2019.01);
(Continued)

(58) Field of Classification Search
CPC ........ G06N 20/00; G06N 3/08; G06V 10/774; G06V 10/44; G06V 10/776; G06V 20/56;
(Continued)

(56) References Cited

U.S. PATENT DOCUMENTS 6,597,800 B1 * 7/2003 Murray .................. G06V 10/40
382/103
2014/0270548 A1 * 9/2014 Kamiya ................. G06V 10/87
382/224

(Continued)

FOREIGN PATENT DOCUMENTS

JP  2000020722 A  *  1/2000
JP  2009003787 A  *  1/2009
(Continued)

OTHER PUBLICATIONS

International Search Report issued Jan. 28, 2020 in International (PCT) Application No. PCT/JP2019/046123.
(Continued)

*Primary Examiner* — Dung Hong
(74) *Attorney, Agent, or Firm* — Wenderoth, Lind & Ponack, L.L.P.

(57) ABSTRACT

An information processing method includes the following executed by a computer: acquiring a first image and object data of an object appearing in the first image, extracting a portion of the first image that corresponds to a difference between the object data and an object detection result obtained by inputting the first image to a trained model, the trained model receiving an image as input to output an object detection result, acquiring a second image that includes a portion corresponding to the same object data as object data corresponding to the extracted portion of the first image, reflecting an image based on the extracted portion of the first image in the portion of the acquired second image that
(Continued)

corresponds to the same object data, and generating training data for the trained model.

11 Claims, 13 Drawing Sheets

(51) Int. Cl.
| | | |
|---|---|---|
| *G06F 18/214* | (2023.01) | |
| *G06N 20/00* | (2019.01) | |
| *G06V 10/774* | (2022.01) | |
| *G06V 10/776* | (2022.01) | |
| *G06V 20/56* | (2022.01) | |

(52) U.S. Cl.
CPC .......... *G06V 10/774* (2022.01); *G06V 10/776* (2022.01); *G06V 20/56* (2022.01)

(58) Field of Classification Search
CPC ......... G06T 2207/20081; G06F 18/217; G06F 18/214
See application file for complete search history.

(56) References Cited

U.S. PATENT DOCUMENTS

| | | | |
|---|---|---|---|
| 2016/0232498 A1* | 8/2016 | Tomlin, Jr. ......... | G06Q 30/0206 |
| 2018/0211138 A1* | 7/2018 | Yamada ................ | G06V 20/64 |

FOREIGN PATENT DOCUMENTS

| | | | | |
|---|---|---|---|---|
| JP | 2011059810 A | * | 3/2011 | |
| JP | 2012-88787 | | 5/2012 | |
| JP | 2018142173 A | * | 9/2018 | |
| WO | WO-2013015146 A1 | * | 1/2013 | ............. G01S 17/48 |

OTHER PUBLICATIONS

Extended European Search Report issued Apr. 25, 2022 in corresponding European Patent Application No. 19922485.8.

* cited by examiner

FIG. 3

| Scene image | |
|---|---|
| Image-capturing-equipment information | Anterior camera 110  101a |
| Time information | GMT+0900<br>2017/2/20 12:32:01.200 |
| Image-capturing-location information | Latitude:34.738723,<br>Longitude:135.573194,<br>Altitude:unsupported<br>Azimuth:0.12345° |
| Detection information | "Person":(x1,y1)-(x2,y2),<br>... |
| Image capturing parameters | Gain:6dB, White balance: Clear |
| ... | ... |

| Scene ID | 0001.png |
|---|---|
| Time information | GMT+0900<br>2017/2/20 12:32:01.200 |
| Image-capturing-location information | Latitude:34.738723,<br>Longitude:135.573194,<br>Altitude:unsupported<br>Azimuth:0.12345° |
| Annotation information | "Road sign":(x1,y1)-(x2,y2),<br>"Road sign":(x3,y3)-(x4,y4)<br>"Passenger car":(x5,y5)-(x6,y6)<br>... |
| ... | ... |

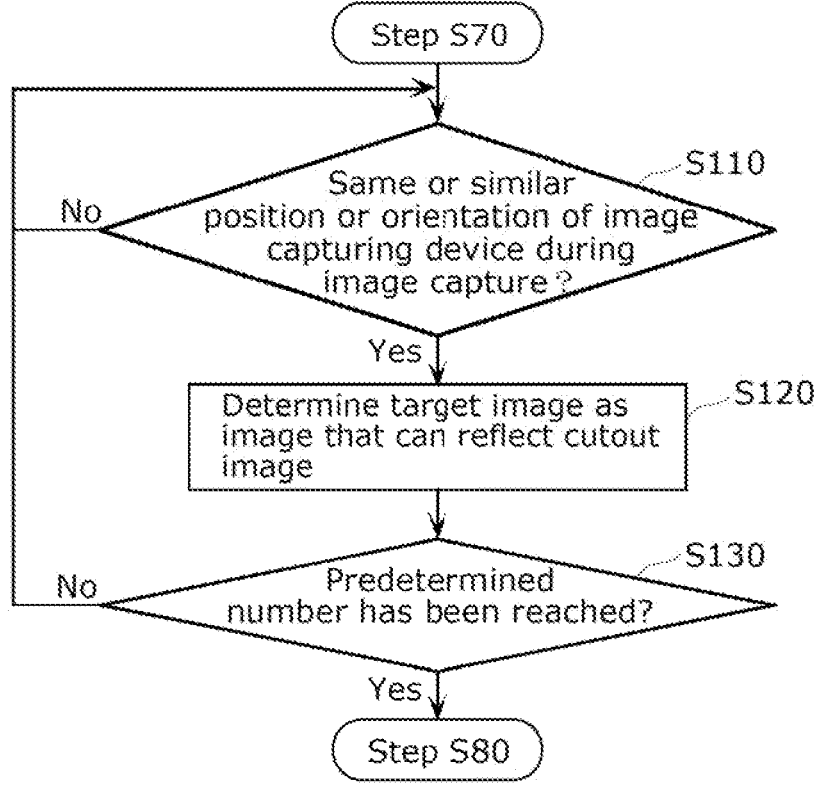

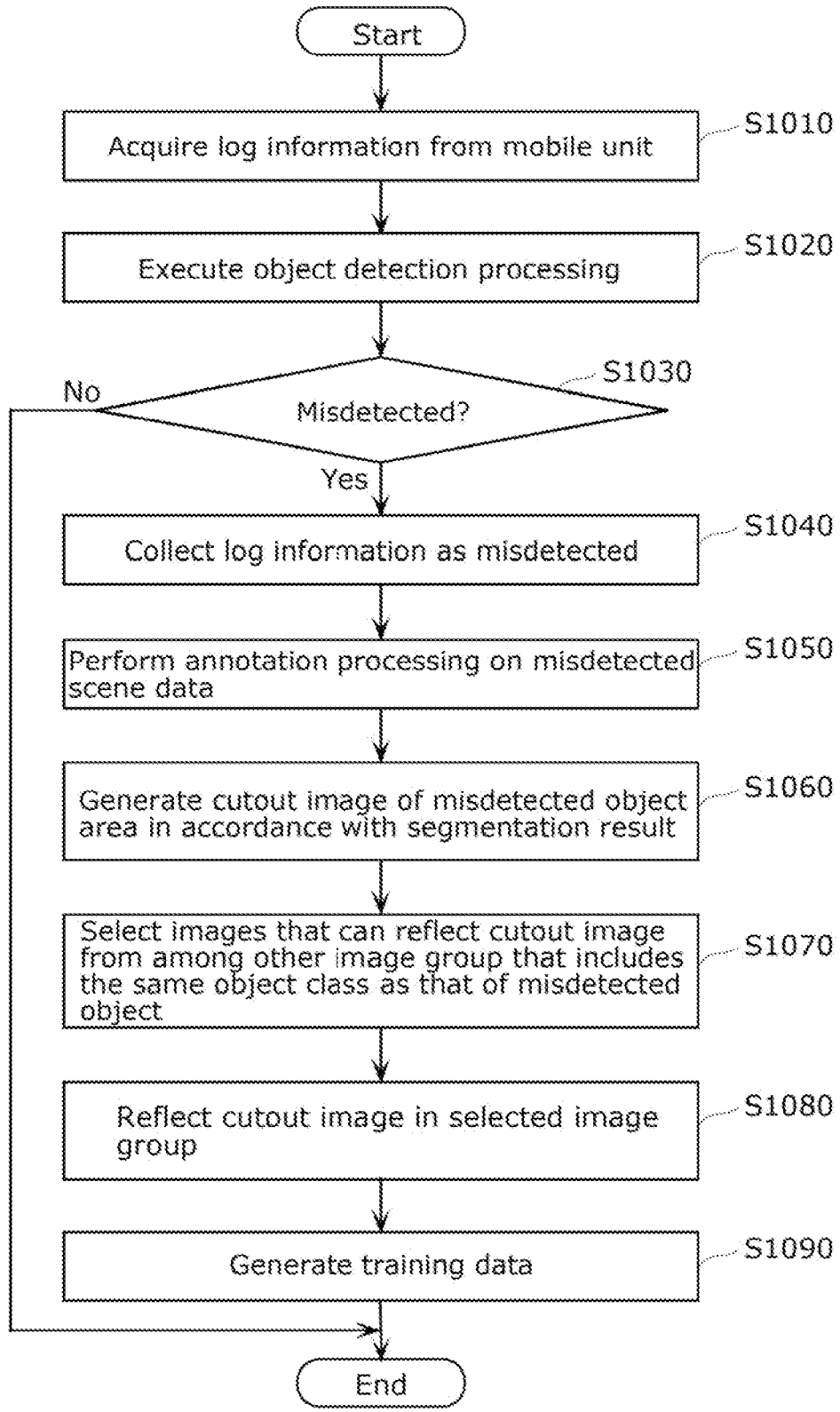

FIG. 13

| Scene image | |
|---|---|
| Image-capturing-equipment information | Anterior camera |
| Time information | GMT+0900<br>2017/2/20 12:32:01.200 |
| Image-capturing-location information | Latitude:34.738723,<br>Longitude:135.573194,<br>Altitude:unsupported<br>Azimuth:0.12345° |
| Detection information | "Person":(x1,y1)-(x2,y2),<br>... |
| ... | ... | ined places.
INFORMATION PROCESSING METHOD AND INFORMATION PROCESSING SYSTEM

CROSS REFERENCE TO RELATED APPLICATIONS

This is a continuation application of PCT International Application No, PCT/JP2019/046123 filed on Nov. 26, 2019, designating the United States of America, which is based on and claims priority of Japanese Patent Application No. 2019-072242 filed on Apr. 4, 2019. The entire disclosures of the above-identified applications, including the specifications, drawings and claims are incorporated herein by reference in their entirety.

FIELD

The present disclosure relates to an information processing method for generating a training data set used in a machine learning process, and an information processing system. More specifically, the present disclosure relates to an information processing method for generating a training data set used in a machine learning process for coping with misdetection caused by an object detection device that detects ordinary objects from an Image, and an information processing system.

BACKGROUND

In recent years, thanks to the adoption of deep learning technology, ordinary-object detection devices have dramatically improved in performance and have been studied and commercialized in large numbers. In self-driving vehicles (robot cars) operated by machines instead of drivers, ordinary-object detection devices for images transferred from, for example, camera devices or distance-measuring sensor devices such as radars or stereo cameras are one of elemental functions of the self-driving vehicles. Ordinary objects refer to, for example, pedestrians, passenger cars, road signs, buildings, and road areas. Self-driving vehicles control their own bodies based on detection information obtained from ordinary-object detection devices and are essentially required to travel safely to intended places.

Therefore, the ordinary-object detection devices need to detect objects accurately, but there is no denying the possibility that the ordinary-object detection devices might cause erroneous detection (hereinafter, referred to as "misdetection"). As a workaround for this case, there is a technique for properly correcting misdetected image data and detection data and using the corrected data as training data in a relearning process performed on the object detection devices. This processing has the effect of preventing the object detection devices from causing similar misdetection. Neural network-type detectors use, for example, transfer learning or fine-tuning as a technique for the relearning process.

The relearning process requires enormous amounts of training data as a workaround for misdetection. Patent Literature (PTL) 1 discloses a method of generating training image data including a recognition target through geometric transformation of an area that reflects the recognition target, and generating a composite image of the same background portion (mere background), a composite image of a different background portion (unnatural), and a composite image of a different object portion (unnatural) so as to generate training image data that does not include a recognition target obtained by a recognizer.

CITATION LIST

Patent Literature

PTL 1: Japanese Unexamined Patent Application Publication No. 2012-88787

SUMMARY

Technical Problem

According to the invention disclosed in PTL 1, however, relearning does not always improve the recognition performance of the recognizer (object detector). For example, in PTL 1, since the area in which the recognition target appears is shifted or rotated randomly during the geometric transformation, the area in which the recognition target appears looks unnatural in the original mage after the geometric transformation and may adversely affect the training effect.

In view of this, it is an object of the present disclosure to provide an information processing method that can improve the certainty that relearning improves the object detection performance of a trained model for object detection, and to provide an information processing system.

Solution to Problem

An information processing method according to one aspect of the present disclosure includes the following executed by a computer: acquiring a first image and object data of an object appearing in the first image, extracting a portion of the first image that corresponds to a difference between the object data and an object detection result obtained by inputting the first image to a trained model, the trained model receiving an image as input to output an object detection result, acquiring a second image including a portion that corresponds to same object data as object data corresponding to the portion of the first image extracted, and generating training data for the trained model by reflecting an image based on the portion of the first image extracted, in the portion of the second image acquired and corresponding to the same object data.

An information processing system according to one aspect of the present disclosure includes an acquirer that acquires a first image and object data of an object appearing in the first image, and a generator that generates training data for a trained model by extracting a portion of the first image that corresponds to a difference between the object data and an object detection result obtained by inputting the first image to the trained model, acquiring a second image that includes a portion corresponding to same object data as object data corresponding to the portion of the first image extracted, and reflecting an image based on the portion of the first image extracted in a portion of the second image acquired that corresponds to the same object data, the trained model receiving an image as input to output an object detection result.

Note that these comprehensive or specific aspects may be implemented as systems, methods, integrated circuits, computer programs, or computer-readable recording media such as CD-ROMs, or may be implemented as any combination of systems, methods, integrated circuits, computer programs, and recording media.

Advantageous Effects

The information processing method and the information processing system according to one aspect of the present disclosure can improve the certainty that relearning improves the object detection performance of a trained model for object detection.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a schematic diagram showing one example of log information acquired by the server device according to Embodiment 1.

FIG. 11A is a flowchart showing a first example of operations of a generator according to a variation of Embodiment 1.

FIG. 11B is a flowchart showing a second example of the operations of the generator according to another variation of Embodiment 1.

FIG. 12 is a flowchart showing operations of a server device according to Embodiment 2.

FIG. 13 is a schematic diagram showing one example of log information acquired by the server device according to Embodiment 2.

Figure 1:
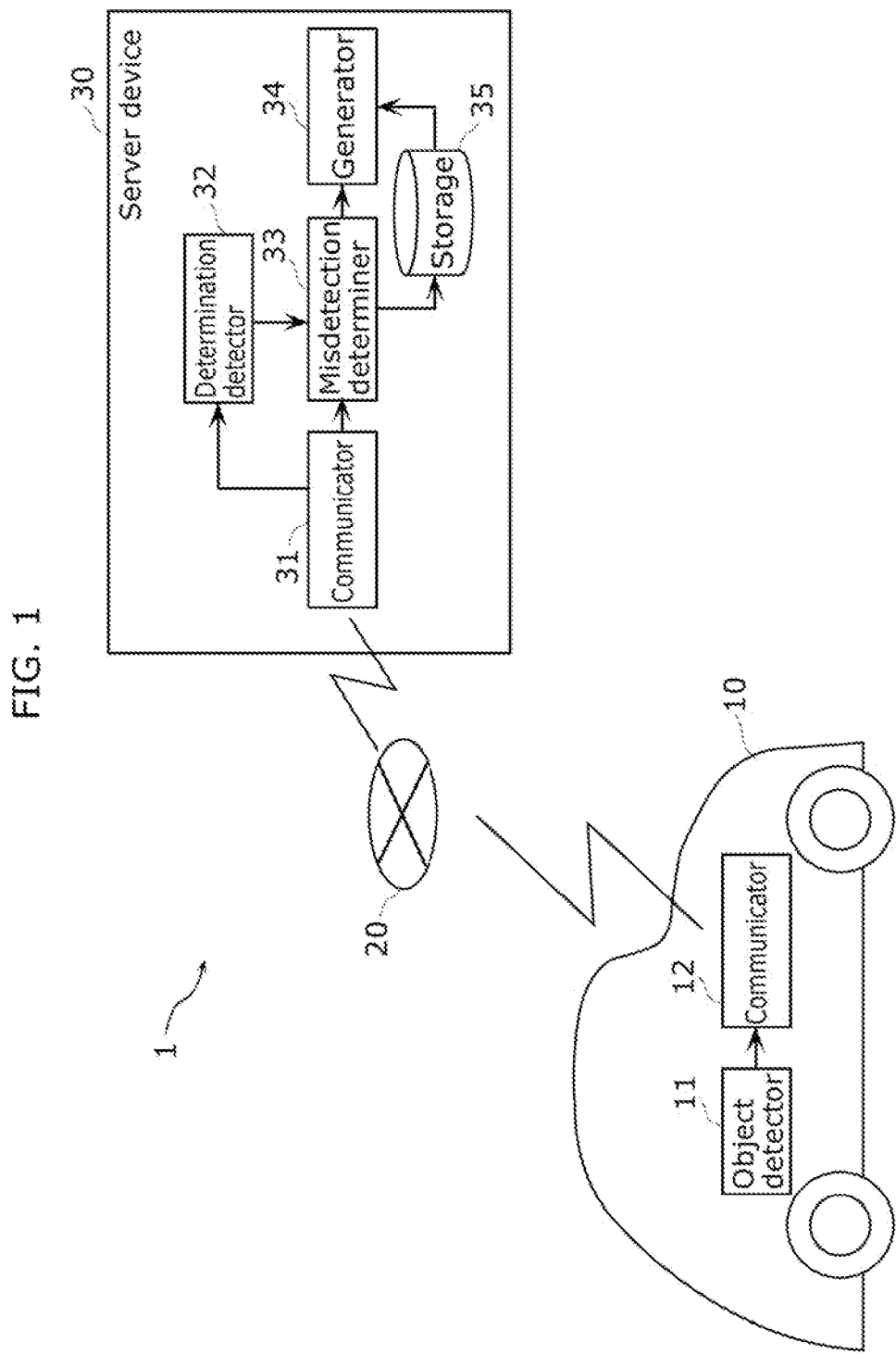
FIG. 1 is a block diagram illustrating a functional configuration of an information processing system according to Embodiment 1.

DESCRIPTION OF EMBODIMENTS (Underlying Knowledge Forming Basis of the Present Disclosure)

In the field of various industrial goods including self-driving vehicles, products that are equipped with neural network-type object detection devices and perform automatic braking based on detection results obtained from the object detection devices have been introduced into the market.

The neural network-type object detection devices, however, require the collection of enormous amounts of image data and annotation operations for training processing. The annotation operations are generally manual operations and entail enormous cost.

Thus, automation technology for creating various types of training data has been proposed. However, no consideration has been given to design and technical solutions to automatic generation of training data for use in effectively taking measures against misdetection caused by object detection devices.

In view of this, the inventors of the present application have eagerly considered the generation of training data in order to effectively take measures against misdetection caused by an object detection device, and have invented an information processing method and an information processing system described hereinafter.

An information processing method according to one aspect of the present disclosure includes the following executed by a computer: acquiring a first image and object data of an object appearing in the first image, extracting a portion of the first image that corresponds to a difference between the object data and an object detection result obtained by inputting the first image to a trained model, the trained model receiving an image as input to output an object detection result, acquiring a second image including a portion that corresponds to same object data as object data corresponding to the portion of the first image extracted, and generating training data for the trained model by reflecting an image based on the portion of the first image extracted, in the portion of the second image acquired and corresponding to the same object data.

Accordingly, it is possible to automatically generate the training data. The second image includes a portion corresponding to the same object data as the object data (e.g., object class) that corresponds to the portion of the first image (misdetected object), The image generated by reflecting (e.g. superimposing or substituting) the misdetected object in this second image looks natural with less discomfort. That is, it is possible to reduce a situation in which the use of unnatural images as training data adversely affect the training effect.

Accordingly, the information processing method according to one aspect of the present disclosure can improve the certainty that relearning improves the object detection performance of a trained model for object detection.

For example, the extracting of the portion of the first image further includes: acquiring the object detection result and comparing the object detection result acquired with the object data, and extracting the portion of the first image in accordance with a comparison result.

This allows the computer (e.g., server device) to perform processing by one operation. In other words, every processing for generating the training data can be automatized, and accordingly the training data can be generated at lower cost.

For example, the image based on the portion of the first image is an image obtained by processing the portion of the first image.

Accordingly, the image based on the portion of the first image can be acquired from the first image. In other words, the training data can be generated based on the misdetected object itself (the portion of the first image). Thus, effective training data can be generated for the misdetected object.

For example, the image based on the portion of the first image is an image similar to the portion of the first image and selected from images prepared in advance.

Accordingly, the image based on the portion of the first image can be acquired without processing the first image. For example, even if it is difficult to cut out the portion of the first image from the first image, training data can be generated using the image similar to the portion of the first image. In the case where the selected image is a 3D image, the orientation (e.g., inclination) of the 3D image can be easily changed. Accordingly, a more natural image can be generated when reflecting the selected image in the second image, and therefore more effective training data can be generated.

For example, the acquiring of the second image includes acquiring, as the second image, an image that is captured by an image capturing device whose location or orientation is same as or similar to a location or orientation of the image capturing device that captures the first image.

Accordingly, it is possible to generate training data that is effective for training processing for passenger cars, such as route buses or taxis, that travel on determined courses.

For example, the acquiring of the second image may include acquiring, as the second image, an image that is captured in same or similar time period or weather as or to a time period or weather when the first image is captured. Alternatively, for example, the acquiring of the second image may include acquiring, as the second image, an image that is captured with same or similar luminance or brightness in an image capturing direction as or to luminance or brightness in an image capturing direction when the first image is captured. As another alternative, for example, the acquiring of the second image may include acquiring, as the second image, an image in which a size of a portion corresponds to the same object data as object data corresponding to the portion of the first image is same as or similar to a size of the portion of the first image.

Accordingly, it is possible to select the second image in an environment that is close to the environment in which the first image has been acquired. The image generated by reflecting the misdetected object in this second image becomes similar in environment to the first image. For example, in the case of performing fine-tuning, relearning using such an image similar in environment improves the certainty that the relearning improves the object detection performance of a trained model for object detection. Accordingly, more effective training data can be generated.

For example, the acquiring of the second image includes acquiring, as the second image, an image whose area data around a portion corresponding to same object data as object data corresponding to the portion of the first image is same as or similar to area data around the portion of the first image.

Accordingly, it is possible to generate a natural image with less discomfort and to generate more effective training data.

For example, the first image and the second image are captured images, and the acquiring of the second image includes acquiring, as the second image, an image that is captured by an image capturing device whose image capturing parameter is same as or similar to an image capturing parameter of an image capturing device that captures the first image.

Accordingly, it is possible to generate training data that includes an image similar in environment to the first image, on the basis of information other than the subject (misdetected object).

An information processing system according to one aspect of the present disclosure includes an acquirer that acquires a first image and object data of an object appearing in the first image, and a generator that generates training data for a trained model by extracting a portion of the first image that corresponds to a difference between the object data and an object detection result obtained by inputting the first image to the trained model, acquiring a second image that includes a portion corresponding to same object data as object data corresponding to the portion of the first image extracted, and reflecting an image based on the portion of the first image extracted in a portion of the second image acquired that corresponds to the same object data, the trained model receiving an image as input to output an object detection result.

This allows the computer to execute the above-described information processing method in accordance with the program.

Note that these comprehensive or specific aspects may be implemented as systems, devices, methods, integrated circuits, computer programs, or computer-readable recording media such as CD-ROMs, or may be implemented as any combination of systems, devices, methods, integrated circuits, computer programs, and recording media.

Hereinafter, embodiments of the present disclosure will be described in detail with reference to the drawings. It is to be noted that each embodiment described below is a specific example of the present disclosure. Numerical values, shapes, constituent elements, steps, the sequence of steps, and so on are described in the following embodiments are merely examples and do not intend to limit the scope of the present disclosure. Among the constituent elements described in the following embodiments, those that are not recited in any one of the independent claims are described as arbitrary constituent elements. It is also possible to combine each of the contents described in all of the embodiments.

Each figure is a schematic diagram and is not always a precise illustration.

In the specification of the present disclosure, terms indicating the relationship between elements, such as being the same, terms indicating the shapes of elements, such as a rectangle, and numerical values and the ranges of numerical values are not expressions that represent only precise meaning, but are expressions that means the inclusion of substantially equivalent ranges such as differences within the range of several percent.

In the specification of the present disclosure, misdetection caused by an object detection device (object detector) includes undetection. That is, misdetection includes meaning that the object detector could not properly detect an object and meaning that the object detector could not detect any object. Embodiment 1 describes a case where the object detector could not properly detect an object, and Embodiment 2 describes a case where the object detector has erroneously detected an object that is not to be detected.

Embodiment 1

An information processing method and an information processing system according to the present embodiment will be described hereinafter with reference to FIGS. 1 to 10.

[1-1. Configuration of Information Processing System]

First, a configuration of information processing system 1 that includes server device 30 according to the present embodiment will be described with reference to FIG. 1. FIG. 1 is a block diagram illustrating a functional configuration of information processing system 1 according to the present embodiment.

As illustrated in FIG. 1, information processing system 1 includes mobile unit 10 and server device 30.

Mobile unit 10 is, for example, a vehicle. The vehicle may, for example, be a self-driving vehicle that controls its operation without necessitating any driver's operation, or may be a vehicle capable of travelling while switching the mode between automatic operation and manual operation.

Mobile unit 10 includes object detector 11 and communicator 12. Mobile unit 10 further includes a plurality of sensors that include an optical sensor such as a camera (not shown) that generates an image by capturing the surroundings of mobile unit 10. Object detector 11 detects objects around mobile unit 10 in accordance with information acquired from the sensors such as the optical sensor. The following description is given of the case where the optical sensor is a camera and object detector 11 acquires an image from the camera and detects objects around mobile unit 10 in accordance with the acquired image.

Object detector 11 detects objects on the basis of the input sensor data such as an image. Object detector 11 is an information processor that controls processing performed on an object detection model (trained model) and is configured as an electric circuit. The object detection model is a neural network-type mathematical model (inference device) having a plurality of layers, and includes a mathematical model for performing object detection processing.

Basically, the object detection model has a plurality of processing layers that include an input layer, an intermediate layer, and an output layer. The input layer receives input of data to be processed in object detection processing as input data (input information). Then, data indicating a processing result of the object detection processing is output as output data (output information) from the output layer. The input layer and the output layer are different processing layers, and a processing layer between the input and output layers is referred to as an intermediate layer. The object detection model may have a plurality of intermediate layers.

For example, an object detection model obtained by training using training data is installed in object detector 11. In the present embodiment, the object detection model has been trained so as to be capable of detecting two object classes, namely "passenger car" and "person," on the basis of the image serving as the input data.

Object detector 11 also generates log information (see FIG. 3) to be transmitted to server device 30, on the basis of the image to be detected and a detection result. The log information will be described later, but includes an image that reflects a detection target and a detection result obtained from object detector 11.

Communicator 12 is a communication circuit (in other words, communication module) that allows mobile unit 10 to communicate with server device 30. Communicator 12 functions as a log transfer device that transfers the log information generated by object detector 11 to server device 30 via network 20. There are no particular limitations on the timing of transmission of the log information from communicator 12. The log information may be transmitted one after another, or may be transmitted at regular time intervals.

Note that mobile unit 10 may include a storage (storage device) that stores the log information.

Network 20 is a wide area network (WAN) such as the Internet. Mobile unit 10 and server device 30 are connected so as to be capable of wireless communication via network 20 (specifically, via a relay device (not shown) provided at the end of network 20).

Server device 30 is an information processing device (training data set generator) that generates a training data set used in relearning of a trained model for object detection (object detection model). For example, server device 30 is operated by a manufacturer that has manufactured the object detection model installed in object detector 11 of mobile unit 10, or by other operators.

Server device 30 includes communicator 31, determination detector 32, misdetection determiner 33, generator 34, and storage 35.

Communicator 31 is a communication circuit (in other words, communication module) that allows server device 30 to communicate with mobile unit 10. Communicator 31 functions as a log collector that receives the log information from mobile unit 10 via network 20. Communicator 31 outputs the received log information to determination detector 32 and misdetection determiner 33. Note that communicator 31 is one example of the acquirer.

Determination detector 32 is a processing unit that performs object detection processing on an image included in the log information. Determination detector 32 performs computation on a larger scale than object detector 11 and thus can more accurately detect objects. In the present embodiment, determination detector 32 includes an object detection model that has been trained so as to be capable of executing image segmentation (semantic segmentation), and uses the object detection model to execute image segmentation on an image. Executing image segmentation refers to executing processing for labeling each of a plurality of pixels in the image with a meaning indicated by the pixel. This corresponds to labelling each pixel with an object class, i.e., with a category.

Note that determination detector 32 may include object classes that can be detected by object detector 11 (in the present embodiment, "passenger car" and "person") and an object detection model that has been trained so as to be capable of detecting a larger number of object classes than the above object classes, and may use the trained model to execute object detection processing.

Determination detector 32 outputs a detection result to misdetection determiner 33. In the present embodiment, determination detector 32 outputs a segmentation result (see FIG. 8), which is a result of execution of image segmentation, to misdetection determiner 33.

Misdetection determiner 33 is a processing unit that determines whether or not the detection result obtained from object detector 11 is correct (i.e., whether or not objection detection by object detector 11 is misdetection) on the basis of the log information acquired from object detector 11 and the detection result obtained from determination detector 32. For example, misdetection determiner 33 makes the aforementioned determination on the basis of whether or not there is a difference between the detection result obtained from object detector 11 and the detection result obtained from determination detector 32. Misdetection determiner 33 outputs a determination result to generator 34.

Generator 34 is a processing unit that generates training data used in relearning of the object detection model included in object detector 11 on the basis of the determination result obtained from misdetection determiner 33. The present embodiment is characterized in the method of generating training data in generator 34. Although details of the method will be described later, generator 34 cuts out an object for which misdetection determiner 33 has determined that the detection result obtained from object detector 11 is incorrect, from an image that reflects the object. Then, generator 34 performs processing for increasing (padding) the number of pieces of effective training data by superimposing or substituting the cutout image on or into another image that reflects an object of the same object class (e.g., "passenger car") as the object class of the object. Note that "cutting out" is one example of extraction.

The training data may be data used as input data for the relearning of the object detection model, or may be test data used to verify detectivity of the relearned object detection model.

Storage 35 is a storage device that stores an image group (see FIG. 7) including a plurality of images for padding the number of pieces of training data. The image group may be stored in advance. Storage 35 may also store, as an image group, images included in the log information acquired from misdetection determiner 33. In this case, these images and the detection results for the images obtained from determination detector 32 are stored respectively in association with one another.

Note that each of the images included in the image groups stored in storage 35 may be further associated with various types of information included in the log information illustrated in FIG. 3, which will be described later. For example, each of the images included in the image groups may be associated with information such as weather and time (or a time period) of image capture of the image. Each of the images included in the image groups may also be associated with information such as the position or orientation of the camera when having captured the image. Each of the images included in the image groups may also be associated with information such as luminance (e.g., luminance of the object in the image) or brightness (e.g., brightness of the object in the image) in the image. The brightness in the image may, for example, be information acquired by a sensor other than the camera.

In the case where the images included in the log information are stored as an image group, the log information itself (see FIG. 3) may be stored. In this case, the detection information included in the log information is the object detection result obtained from determination detector 32. In other words, storage 35 does not necessarily have to store the object detection result obtained from object detector 11.

Storage 35 may also store, for example, programs to be executed by each processing unit included in server device 30. For example, storage 35 is configured as a semiconductor memory.

As described above, server device 30 includes determination detector 32 with higher performance on, for example, images of misdetected scene data in terms of precision than object detector 11 that is to be enhanced (targeted for relearning). Server device 30 uses the segmentation result or detection result obtained from determination detector 32 and generates training data as a workaround to misdetection by cutting out a misdetected image area and reflecting cutout image 120 in other images that reflect an object of the same object class as the object class. This improves the effect of a relearning process performed on object detector 11 to cope with misdetection.

[1-2. Operations of Server Device]

Figure 2:
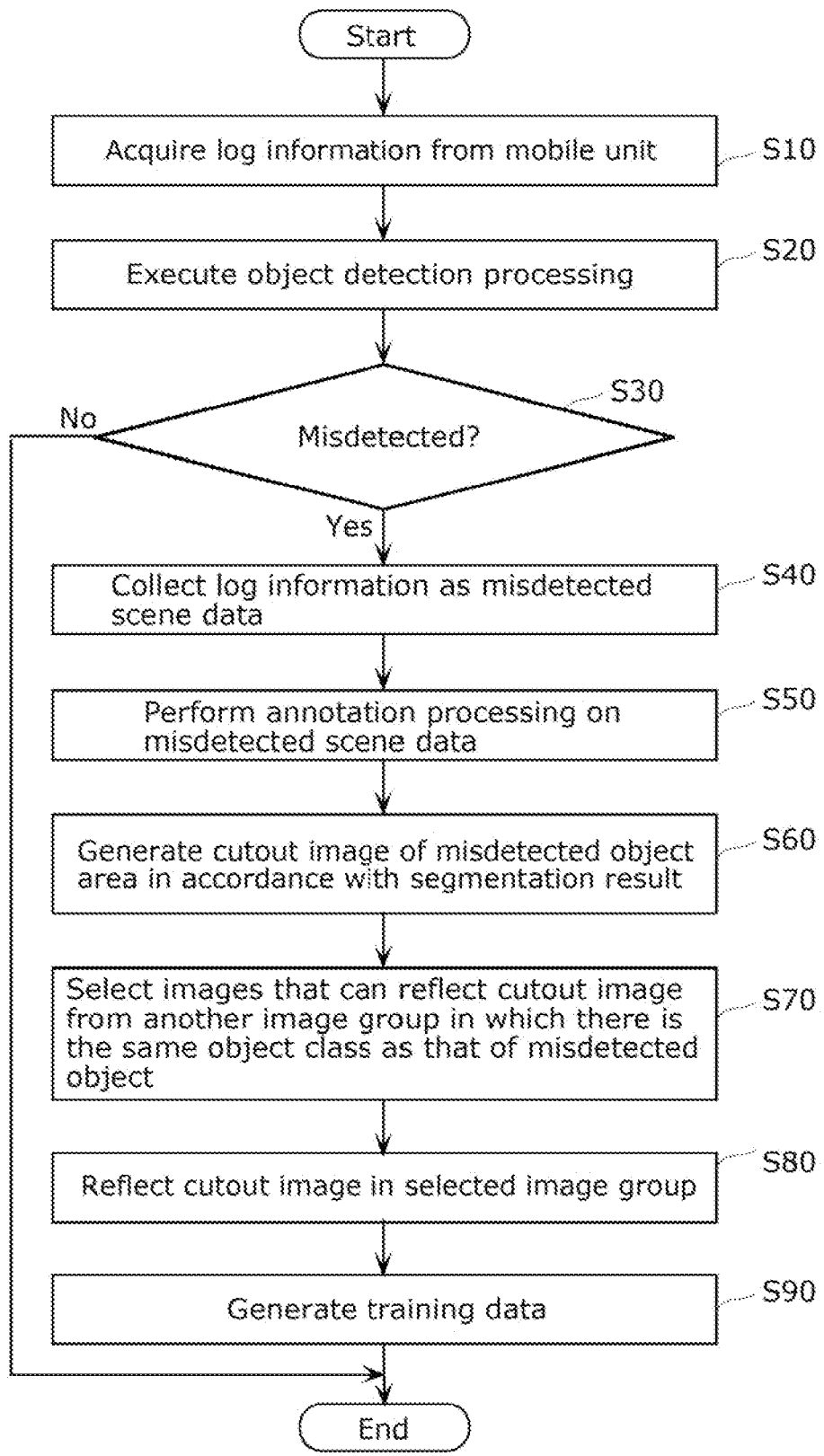
FIG. 2 is a flowchart illustrating operations of a server device according to Embodiment 1.

Next, operations of server device 30, an image to be generated, and so on will be described with reference to FIGS. 2 to 10. FIG. 2 is a flowchart illustrating operations of server device 30 according to the present embodiment.

As illustrated in FIG. 2, first, server device 30 acquires log information from mobile unit 10 (S10). Specifically, communicator 31 receives the log information from mobile unit 10. Then, communicator 31 outputs the received log information to determination detector 32 and misdetection determiner 33. Note that, out of various types of data included in the log information, only an image may be output to determination detector 32.

Here, the log information that communicator 31 receives from mobile unit 10, i.e., the log information generated by object detector 11 of mobile unit 10, will be described with reference to FIG. 3. FIG. 3 is a schematic diagram showing one example of log information 100 acquired by server device 30 according to the present embodiment.

As illustrated in FIG. 3, log information 100 includes, for example, a scene image, image-capturing-equipment information, time information, image-capturing-location information, detection information, and image capturing parameters.

The scene image (hereinafter, also referred to simply as an "image") is image 101 captured by the camera of mobile unit 10 and targeted for execution of object detection processing. Image 101 may be associated with object area 101a corresponding to the detection information. In the example in FIG. 3, an area where target object 110 exists is referred to as object area 101a.

The image-capturing-equipment information is information on the camera used to capture the image. For example, the image-capturing-equipment information is information for identifying the camera that has captured image 101, and in the example in FIG. 3, information on an anterior camera.

The time information is information indicating the time when image 101 has been captured.

The image-capturing-location information is information indicating the location and azimuth of image 101 captured.

The detection information is information indicating, for example, the detection result obtained for target object 110 for image 101 by object detector 11. Specifically, the detection information includes information indicating the detection result and object area 101a corresponding to the detection result. FIG. 3 shows an example in which the detection result obtained from object detector 11 for target object 110, i.e., a "passenger car", is "person". That is, log information 100 illustrated in FIG. 3 is log information obtained when object detector 11 has misdetected the object. Although object area 101a is illustrated as a rectangle, the shape of object area 101a is merely one example, and the shape of object area 101a may be other than the rectangle.

The image capturing parameters are information indicating image capturing conditions for the camera when having captured image 101. For example, the image capturing conditions include gain and white balance.

Figure 4:
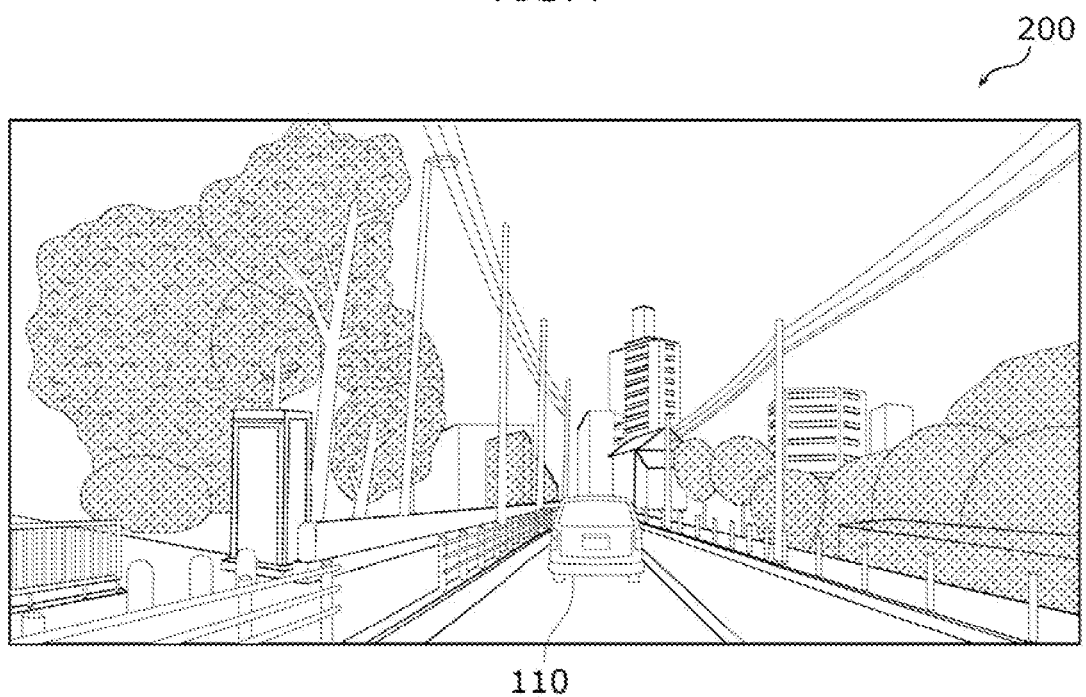
FIG. 4 shows one example of an image that is input to a determination detector according to Embodiment 1.
Figure 5:
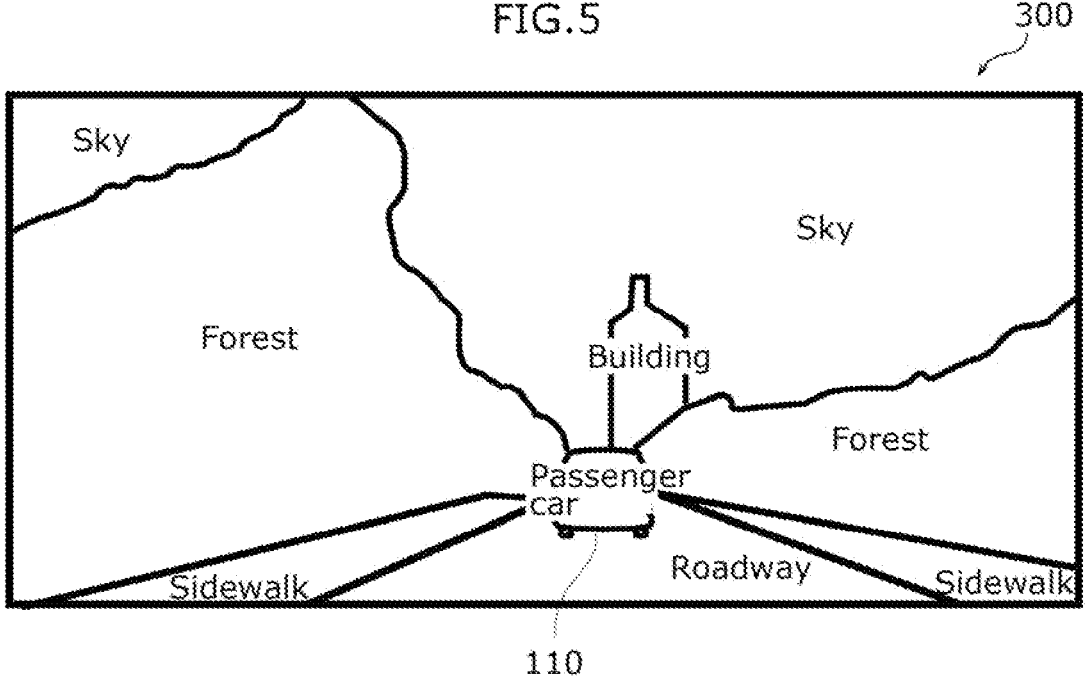
FIG. 5 is a diagram showing a detection result obtained from the determination detector according to Embodiment 1.

Referring back to FIG. 2, determination detector 32 executes object detection processing, using image 101 included in log information 100 acquired from communicator 31 as input data (S20), FIG. 4 shows one example of image 200 input to determination detector 32 according to the present embodiment. FIG. 5 is a diagram illustrating the detection result obtained from determination detector 32 according to the present embodiment. Image 200 is the same image as image 101 included in log information 100. Note that object area 101a is not included in image 200 that is input to determination detector 32.

As a result of the input of image 200 illustrated in FIG. 4 to determination detector 32, segmentation result 300 illustrated in FIG. 5 is output. FIG. 5 indicates that target object 110 illustrated in FIG. 4 is determined as a "passenger car".

In this way, determination detector 32 is capable of detecting objects more accurately than object detector 11 of mobile unit 10, and therefore can accurately detect the object that has been misdetected by object detector 11.

Determination detector 32 outputs the detection result (here, segmentation result 300) to misdetection determiner 33.

Referring back to FIG. 2, misdetection determiner 33 determines whether or not the detection by object detector 11 is misdetection, on the basis of the detection result obtained from determination detector 32 and log information 100 (i.e., the detection result obtained from object detector 11 of mobile unit 10) (S30). For example, misdetection determiner 33 makes the aforementioned determination depending on whether or not there is a difference between the detection result obtained from determination detector 32 and the detection result obtained from object detector 11. In the present embodiment, the detection result obtained from determination detector 32 for target object 110 is a "passenger car" (see FIG. 5), whereas the detection result obtained from object detector 11 of mobile unit 10 for target object 110 is a "person" (see FIG. 3).

In this way, if there is a difference between the detection result obtained from determination detector 32 and the detection result obtained from object detector 11, misdetection determiner 33 determines that the detection by object detector 11 is misdetection. If there is determined to be misdetection (Yes in S30), misdetection determiner 33 collects log information 100 corresponding to this image as misdetected scene data (S40). Then, misdetection determiner 33 outputs the collected misdetected scene data to generator 34. For example, misdetection determiner 33 outputs the misdetected scene data and segmentation result 300 corresponding to the misdetected scene data to generator 34. Note that the misdetected image refers to an image that reflects misdetected target object 110. The presence of a difference between the detection result obtained from determination detector 32 and the detection result obtained from object detector 11 also includes, for example, the case where the object detected by determination detector 32 has not been detected by object detector 11. That is, misdetection by object detector 11 also includes the case where object detector 11 has failed to detect an object that is intrinsically supposed to be detected.

If there is determined to be no misdetection (No in S30), misdetection determiner 33 finishes the processing.

Next, generator 34 performs annotation processing on the misdetected scene data acquired from misdetection determiner 33 (S50). Generator 34 performs annotation processing based on the detection result obtained from determination detector 32 on the misdetected scene data. In the present embodiment, generator 34 performs annotation processing based on segmentation result 300 on the misdetected scene data. Specifically, an object class of target object 110 is changed from "person" to "passenger car". The annotated misdetected scene data (i.e., log information with corrected detection result) may be used as training data.

Here, in order to generate an object detection model that reduces misdetection by object detector 11, i.e., enables high-precision object detection, the number of pieces of training data is, for example, as large as possible. Although training data can be extracted from among a plurality of pieces of log information 100 received from mobile unit 10, much time and manpower becomes necessary to extract effective training data. In view of this, generator 34 performs processing for increasing the number of pieces of training data in order to reduce misdetection (padding processing). In order to reduce misdetection by object detector 11, generator 34 generates effective training data in accordance with predetermined rules. The following description is given of processing performed when generator 34 generates effective training data.

Figure 6:
FIG. 6 is a diagram showing one example of a cutout image according to Embodiment 1.

Generator 34 generates a cutout image by cutting out misdetected object area 101a from image 101 of the misdetected scene data on the basis of segmentation result 300 (S60). Specifically, cutout image 120 as illustrated in FIG. 6 is generated by cutting out target object 110. FIG. 6 is a diagram showing one example of cutout image 120 according to the present embodiment.

For example, in the case where there is an object that hides part of target object 110 (e.g., an object located between mobile unit and target object 110 and overlapping with target object 110 when viewed from mobile unit 10) in image 101, generator 34 may cut out this object together with target object 110 as an integral unit. For example, in the case where there is another object that hides target object 110 between target object 110 to be cut out and the vehicle (mobile unit 10) and this other object can also be cut out using a display-area threshold value (e.g., the size of cutout image 120) set in advance in accordance with the segmentation result, these objects may be cut out in a cluster. Target object 110 and the other object may, for example, be of the same object class (e.g., "passenger car"). By reflecting the cutout image cut out in a cluster in other images, a natural image with less discomfort can be generated as training data.

In this way, images obtained by superimposition on or substitution into other images (one example of an image based on a portion of a first image) may, for example, be images (e.g., cutout image 120) obtained by processing target object 110 (one example of the first image) in image 101. Note that cutout image 120 may be subjected to predetermined image processing.

Referring back to FIG. 2, next, generator 34 selects images that can reflect cutout image 120, from a group of other images in which there is an object of the same object class (e.g., "passenger car") as the object class of the misdetected object (here, target object 110) (S70). Note that the reflection includes superimposition and substitution.

Figure 7:
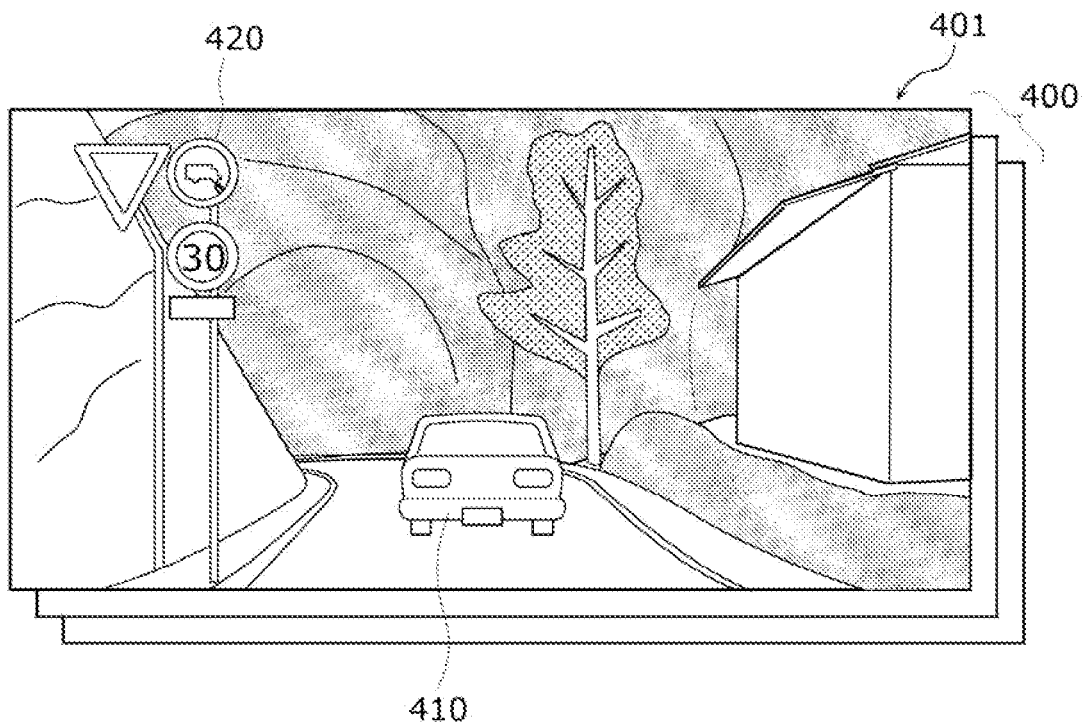
FIG. 7 is a diagram showing one example of an mage group stored in a storage.
Figure 8:
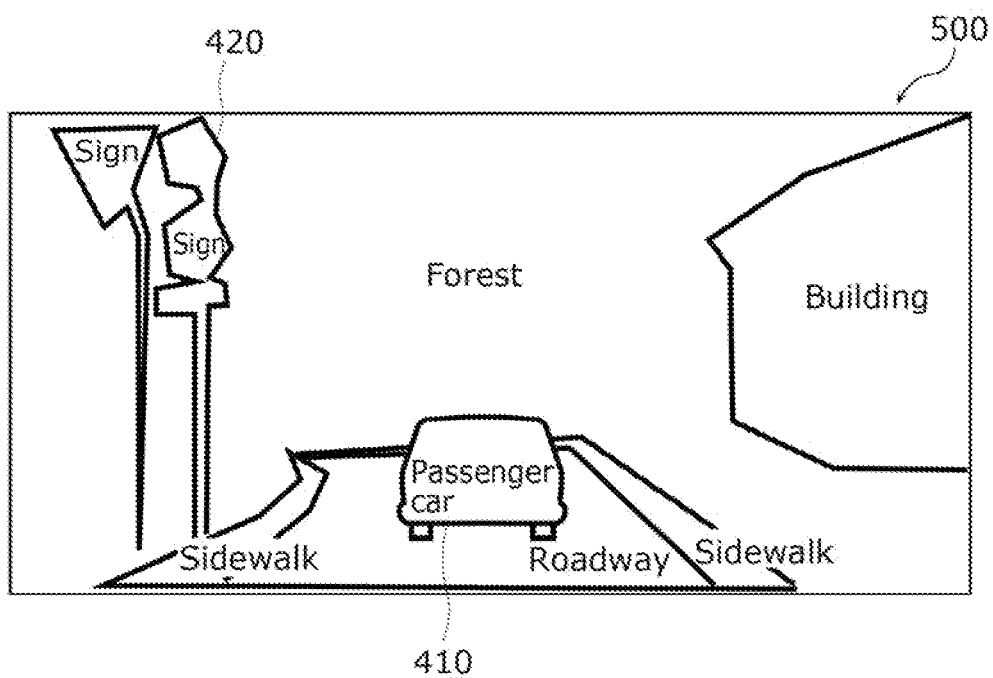
FIG. 8 is a diagram showing a detection result obtained for images included in the image group from the determination detector.

FIG. 7 is a diagram showing one example of image group 400 stored in storage 35. FIG. 8 is a diagram illustrating the detection result obtained from determination detector 32 for image 401 included in image group 400. Specifically, segmentation result 500 for image 401 is illustrated in FIG. 8.

As illustrated in FIG. 7, there are target objects 410 and 420 in image 401. As illustrated in FIG. 8, the object class of target object 410 is "passenger car", and the object class of target object 420 is "sign". Target object 410 is of the same object class as target object 110 in image 101. Generator 34 determines whether or not the object class of target object 410 is the same as the object class of target object 110, on the basis of the detection results obtained from determination detector 32 for these target objects. Here, the object class of target object 110 and the object class of target object 410 are both "passenger car".

In this way, generator 34 selects image 401 in which there is an object of the same object class as the misdetected object class from image group 400 stored in advance, on the basis of segmentation results 300 and 500 obtained using determination detector 32. Image 401 in which there is an object of the same object class as the misdetected object class is one example of the image that can reflect cutout image 120.

Alternatively, in step S70, generator 34 may preferentially select an image that can reflect target object 110 without changing the size, from image group 400 as an image that can reflect target object. As another alternative, generator 34 may select an image that can reflect target object 110 with a predetermined enlarged or reduced magnification, as an image that can reflect the target object.

Referring back to FIG. 2, generator 34 reflects cutout image 120 in a group of selected images (S80). For example, generator 34 reflects cutout image 120 in an area of image 401 selected from image group 400 where there is a "passenger car" according to segmentation result 500 in FIG. 8.

Figures 9A, 9B:
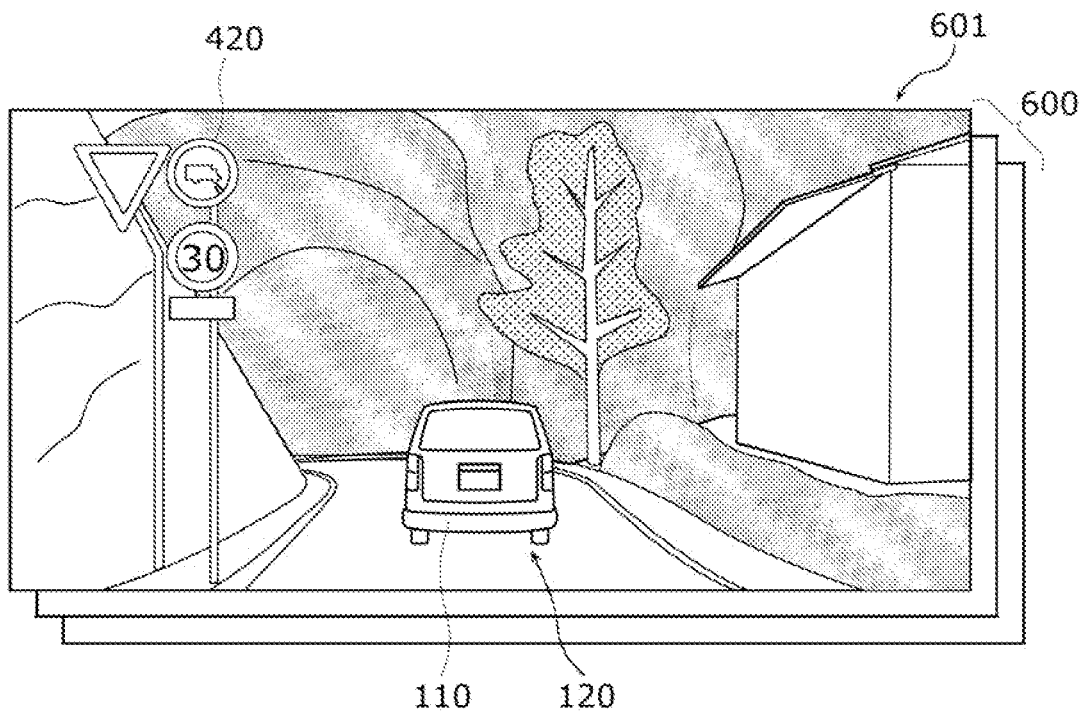
FIG. 9A is a diagram showing one example of an image group include in training data.
FIG. 9B is a diagram showing one example of annotation information included in the training data.

FIG. 9A is a diagram showing one example of image group 600 included in the training data.

As illustrated in FIG. 9A, for example, generator 34 generates image 601 by superimposing cutout image 120, obtained by cutting out target object 110 indicated by cutout image 120, on target object 410 in image 401 illustrated in FIG. 7. Generator 34 superimposes target object 110 on the position of the "passenger car" in image 401, Image 601 is obtained by superimposing target object 110 on the position where target object 110 actually exists (in the present embodiment, a roadway where the "passenger car" exists). Accordingly, it is possible to generate an image close to the real world image. Thus, in the case of fine-tuning of a general-purpose neural network to a neural network dedicated for mobile unit 10, the neural network can be finely tuned so as to be capable of detecting objects more accurately.

In the case of superimposing cutout image 120 on target object 410, for example, target object 410 becomes invisible in the image obtained by the superimposition (e.g., image 601 illustrated in FIG. 9A). For this reason, generator 34 may further superimpose or substitute cutout image 120 whose size is adjusted based on the size of the area where the "passenger car" exists according to segmentation result 500 in FIG. 7, on image 401. The size adjustment includes enlargement and reduction.

The span of adjustable range (one example of an adjustment ratio) may be set in advance. For example, cutout image 120 may be enlarged or reduced within the range of plus or minus 20% of the size of cutout image 120 illustrated in FIG. 6. Note that the enlargement and reduction processing may be executed while keeping the aspect ratio of cutout image 120 constant. In the case of superimposing cutout image 120, the enlargement or reduction ratio may be determined so as to make target object 410 invisible or reduce the visible area of target object 410 (i.e., reduce the area that target object 410 lies off image 601) in image 601 obtained by the superimposition.

Alternatively, in order to avoid only large objects relative to image 401 (e.g., the passenger car indicated by cutout image 120) from being superimposed on image 401, generator 34 may superimpose an object through interpolation using pixels around target object 110 in the original image (e.g., image 101).

As illustrated in FIG. 9B, generator 34 also generates annotation information 700 corresponding to image group 600, on the basis of the annotation information corresponding to image group 400 illustrated in FIG. 7. As illustrated in FIG. 9B, target object 110 is annotated with the "passenger car".

Referring back to FIG. 2, generator 34 generates training data on the basis of image group 600 illustrated in FIG. 9A and annotation information 700 corresponding to image group 600 (S90).

Figure 10:
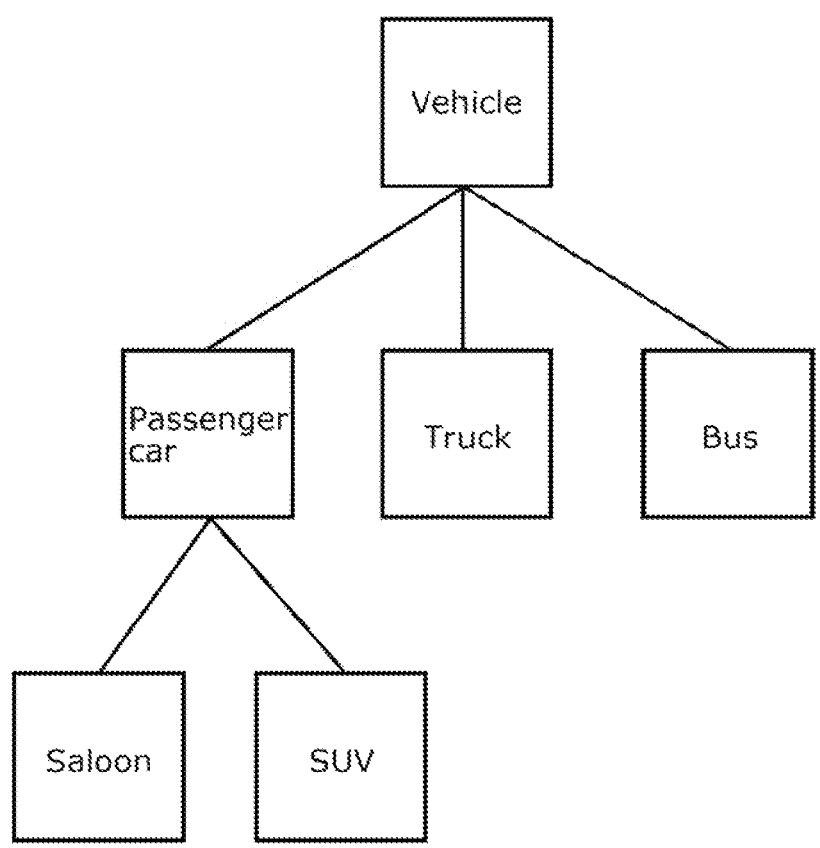
FIG. 10 is a diagram showing one example of a category structure used in object detection.

In the case where the number of pieces of generated training data is less than a preset number, generator 34 may additionally generate training data, using images having annotation information that falls under similar categories. For example, a confirmation is conceivable in which the category structure of object classes is determined in advance as illustrated in FIG. 10, and "bus" or "truck" that falls under the same higher category "vehicle" as "passenger car" are used. Generator 34 may select images that include an object class of either "bus" or "truck" from image group 400, and may execute processing in steps S80 and S90 on the selected images. FIG. 10 is a diagram showing one example of the category structure used in object detection.

In the case where the number of images selected in step S70 is greater than a preset number in advance, generator 34 may use all of the selected images or may extract a previously set number of images from among the selected images to generate training data. For example, generator 34 may extract such images using lower categories of object classes. For example, in the category structure as illustrated in FIG. 10, a configuration of using lower categories "saloon" and "SUV" of "passenger car" is conceivable. In the case where the number of images that can reflect the cutout image, selected in step S70, exceeds the preset number, generator 34 may further preferentially select images that can reflect an object of the same or similar category as or to any lower category (e.g., "saloon") of target object 110 whose object class is "passenger car" and may execute the processing in steps S80 and S90 on the selected images. For example, generator 34 preferentially selects images that reflect an object that can be identified as "saloon".

The category structure illustrated in FIG. 10 is stored in storage 35. Determination detector 32 is capable of detecting, for example, object classes included in the category structure illustrated in FIG. 10.

Although the above description is given of the example in which generator 34 performs processing for superimposing or substituting cutout image 120 on or into other images in which there is an object of the same object class as the object class of target object 110, the present disclosure is not limited to this example. For example, generator 34 may reflect a computer graphics (CG) image such as a 3D model that is similar to cutout image 120, in the images selected in step S70. Generator 34 may generate the CG image based on cutout image 120, or in the case where the CG image of the target object is stored in storage 35, generator 34 may select a CG image with a feature amount similar to the feature amount of cutout image 120. The selected CG image may be an image whose feature amount is most similar to the feature amount of cutout image 120, or may be a plurality of CG images whose feature amounts are similar by a predetermined amount or more to the feature image of the cutout image.

The image (one example of the image based on the portion of the first image) that is to be superimposed on or substituted to other images (images selected in step S70) in this way may, for example, be an image similar to target object 110 (one example of the portion of the first image) and selected from among images prepared in advance. In this case, the size and inclination (e.g. rotation angle) of the CG image may be adjusted. The spans of adjustable ranges of the size and inclination of the CG image are merely examples of the adjustment ratio. Note that the adjustment ratio may be of a value that does not deform the CG image serving as an image and may be set to a value that allows an object to be detected as the object itself.

There are no particular limitations on the timing of execution of the processing performed by determination detector 32, misdetection determiner 33, and generator 34. For example, the processing may be executed every time communicator 31 acquires log information 100 from object detector 11, may be executed at regular time intervals, or may be executed when a predetermined number or volume of log information 100 has been accumulated. For example, in the case where log information 100 includes the reliability of the detection result obtained from object detector 11, determination detector 32 may execute the object detection processing in accordance with this reliability. For example, determination detector 32 may execute the object detection processing preferentially on images that include an object whose reliability of the detection result is less than or equal to a predetermined value, or may execute the object detection processing only on images that include an object whose reliability of the detection result is less than or equal to a predetermined value. This allows server device 30 to more efficiently generate training data.

Although the above description is given of the example in which misdetection determiner 33 acquires the detection result from determination detector 32, compares the acquired detection result (one example of object data) with the detection information included in log information 100 (one example of the object detection result), and extracts target object 110 (one example of the first image) on the basis of the comparison result, the present disclosure is not limited to this example. For example, server device 30 does not necessary have to acquire the detection information included in log information 100. For example, misdetection determiner 33 may acquire information that corresponds to the difference between the detection result obtained from determination detector 32 and the detection result obtained from object detector 11 (e.g., information on target object 110) from a manager who manages server device 30. Misdetection determiner 33 may accept an instruction as to target object 110 targeted for relearning via a receiver (not shown) that serves as a user interface for accepting input from the manager, and output this instruction to generator 34. The instruction as to target object 110 includes information that indicates the location and object class of target object 110 in image 101 included in log information 100.

Although the above description is given of the example in which server device 30 receives log information 100 including the detection information from mobile unit 10, the present disclosure is not limited to this example. Server device 30 may acquire an image captured by mobile unit 10 from mobile unit 10. For example, server device 30 may include an object detector (not shown) that includes the same trained model as the trained model included in object detector 11 of mobile unit 10. Then, misdetection determiner 33 may compare the detection result obtained from this object detector and the detection result obtained from determination detector 32 to determine whether or not there is a difference in detection result (i.e., whether or not the detection result obtained from by the object detector is correct).

As described above, in the information processing method used in server device 30 according to the present embodiment, training data for a trained model is generated by causing a computer to acquire image 101 (one example of the first image) and the object class (one example of the object data) of target object 110 (one example of the object appearing in image 101), to extract a portion (e.g., target object 110) of image 101 that corresponds to a difference between the object data and an object detection result (e.g., segmentation result 300) obtained by inputting image 101 to a trained model that uses image 101 as an input to output an object detection result, to acquire image 401 (one example of a second image) that includes a portion that corresponds to the same object data as the object data (e.g., "passenger car") corresponding to the extracted portion of image 101, and reflecting cutout image 120 (one example of the image based on the portion of the first image) extracted from image 101 on target object 410 (one example of the portion corresponding to the same object data) in image 401 acquired.

Accordingly, it is possible to generate training data that is close to the real world. This improves the certainty that relearning improves the object detection performance of a trained mod& for object detection. Hence, training processing environments effective for the correction of misdetection caused by a neural network-type detector can be achieved at low cost. For example, it is possible to automatically pad the number of pieces of effective training data.

For example, in the case where a significant change is made to the design of passenger cars, object detector 11 of mobile unit 10 may become incapable of detecting the passenger cars. For example, in the case of object detector 11 of a neural network-type, the neural network may be subjected to relearning (additional learning). Using the method as described above to generate training data for relearning improves the certainty of detecting even the passenger cars that have undergone a significant design change.

Variations of Embodiment 1

The server device or the like according to variations of the present embodiment will be described hereinafter with reference to FIGS. 11A to 11F. Note that server devices according to the variations have the same configuration as server device 30 according to Embodiment 1, and therefore a description thereof shall be omitted. Processing that is similar to the processing of server device 30 according to Embodiment 1 may not be described, or may be described in abbreviated form.

The server devices according to the variations of the present embodiment further preferentially select images for use as training data from among the images selected in step S70 illustrated in FIG. 2 through the following processing. For example, the processing illustrated in FIGS. 11A to 11F may be executed when the number of images selected in step S70 exceeds the number of pieces of training data to be generated. Note that the processing in FIGS. 11A to 11F described below is executed between steps S70 and S80 illustrated in FIG. 2.

FIG. 11A is a flowchart showing a first example of operations of generator 34 according to a variation of the present embodiment.

As illustrated in FIG. 11A, generator 34 may further determine, for each of the images selected in step S70, whether or not the image capturing device is in the same location or orientation when capturing the image (S110). Specifically, generator 34 determines whether or not the position or orientation of the image capturing device (e.g., the camera of mobile unit 10) when capturing image 101 included in log information 100 acquired from mobile unit 10 is the same as or similar to the position or orientation of the image capturing device (e.g., the camera of a mobile unit different from mobile unit 110) when capturing each image selected in step S70.

If the position or orientation is the same or similar (Yes in S110), then generator 34 determines this image as an image (one example of the second image) that can reflect the cutout image (S120). Then, generator 34 determines whether or not the number of images determined as the image that can reflect the readout image has reached a predetermined number (S130). When a predetermined number has been reached (S130), generator 34 proceeds to the processing in step S90. If the position or orientation is neither the same nor similar (No in step S110) and if the number of images has not reached a predetermined number (No in step S110), generator 34 returns to step S110 and executes the processing in step S110 on the next image.

Note that the location of the image capturing device is obtained from, for example, the result of GPS positioning, and the location of the image capturing device when capturing image 101 can be acquired from the image-capturing-location information included in log information 100. The orientation of the image capturing device is, for example, the direction in which the optical axis of the image capturing device is directed, and the orientation of the image capturing device when capturing image 101 can be acquired from, for example, the image-capturing-equipment information and the image-capturing-location information included in log information 100.

The term "similar" as used herein means that the location or orientation of the image capturing device that has captured each image selected in step S70 is within a preset predetermined range relative to the position or orientation included in log information 100. The predetermined range may be stored in advance in storage 35.

Accordingly, in the case where the images selected in step S70 include an image (with a different date and time) whose image-capturing-location information is similar within a preset predetermined range, this image is preferentially selected.

Accordingly, it is possible to generate training data that is effective for training processing for passenger cars, such as route buses or taxies, that travel on predetermined courses.

FIG. 11B is a flowchart showing a second example of the operations of generator 34 according to another variation of the present embodiment.

As illustrated in FIG. 11B, generator 34 may further determine, for each of the images selected in step S70, whether or not the time period or the weather during image capture is the same or similar (S210). Specifically, generator 34 determines whether the time period or the weather during image capture of image 101 included in log information 100 acquired from mobile unit 10 is the same as or similar to the time period or the weather during image capture of each image selected in step S70.

Then, if the time period or the weather is the same or similar (Yes in S210), generator 34 executes processing in step S120 onward. If the time period or the weather is neither the same nor similar (No in step S210) and if the predetermined number has not been reached (No in S130), generator 34 returns to step S210 and executes the processing in step S210 on the next image.

The time period during image capture may, for example, be a time, and the time period when image 101 is captured can be acquired from, for example, the time information included in log information 100. The weather during image capture includes, for example, at least one of atmospheric temperature, humidity, the wind conditions (the direction of a wind or the volume of air), cloud conditions (e.g., stratocumulus clouds or nebulosus clouds), and the presence or absence of rainfall or snowfall. For example, the weather during image capture of image 101 can be acquired from the time information and the image-capturing-location information included in log information 100 and information in a database that stores weather information.

The term "similar" as used herein means that the time period or the weather during image capture of each image selected in step S70 is within a preset predetermined range from the time or the weather included in log information 100. For example, "similar in weather" means that the type of the weather is the same (one example of the predetermined range). Alternatively, "similar in weather" may also mean that ambient temperature or humidity, for example, may be within a predetermined range. Examples of the type of the weather include "clear", "fair", "cloudy", "foggy", "rain", and "thunderstorm". The predetermined range may be stored in advance in storage 35.

Accordingly, in the case where the images selected in step S70 include an image that is similar in time period or weather during image capture of the image within a preset predetermined range, this image is preferentially selected. Therefore, it is possible to preferentially select images that are captured in an environment close to the environment when target object 110 has been misdetected. Accordingly, in cases such as where the factors causing misdetection of target object 110 depend on the environment around target object 110, particularly effective training data can be generated.

Figure 11C:
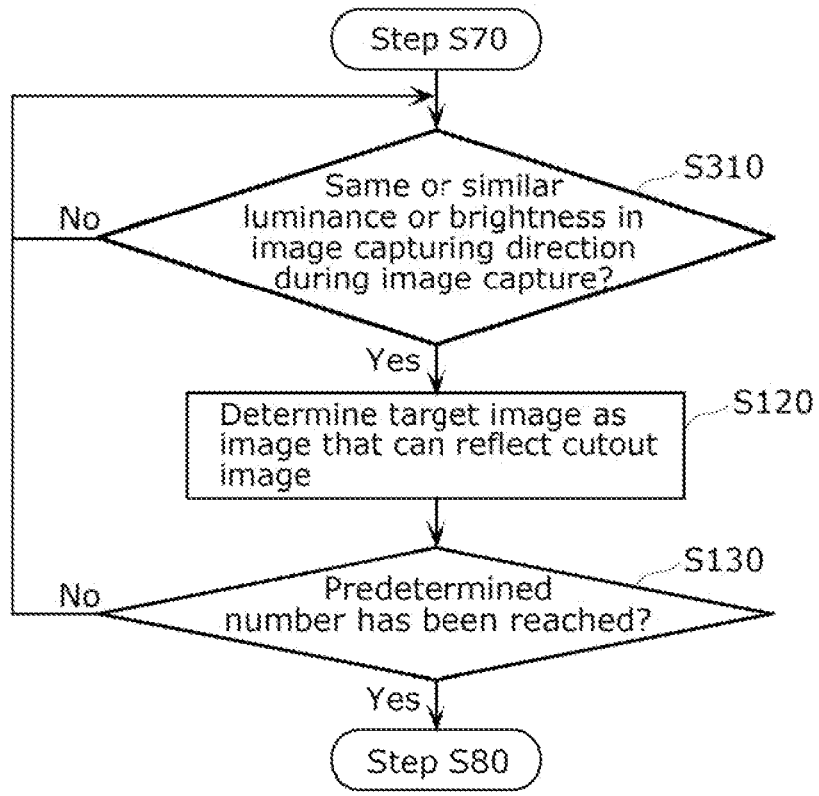
FIG. 11C is a flowchart showing a third example of the operations of the generator according to another variation of Embodiment 1.

FIG. 11C is a flowchart showing a third example of the operations of generator 34 according to another variation of the present embodiment.

As illustrated in FIG. 11C, generator 34 may further determine, for each of the images selected in step S70, whether or not luminance or brightness in the image capturing direction during image capture is the same or similar (S310). Specifically, generator 34 determines whether or not luminance or brightness in the image capturing direction during image capture of image 101 included in log information 100 acquired from mobile unit 10 is the same as or similar to luminance or brightness in the image capturing direction during image capture of each image selected in step S70.

Then, if the luminance or the brightness is the same or similar (Yes in S310), generator 34 executes processing in step S120 onward. If the luminance or the brightens is neither the same nor similar (No in step S310) and a predetermined number has not been reached (No in S130), generator 34 returns to step S310 and executes the processing in step S310 on the next image.

Note that luminance during image capture refers to the luminance of an image, and for example, the luminance during image capture of image 101 can be acquired from image 101 included in log information 100. The luminance may, for example, be the luminance of cutout image 120, but the present disclosure is not limited to this example, and the luminance may be the luminance of image 101 as a whole. The luminance may be calculated by statistical processing. For example, the luminance may be a maximum value, a minimum value, an average value, or a median value of the luminance of cutout image 120. The brightness in the image capturing direction during image capture may, for example, be brightness information acquired from a sensor (e.g., a sensor that detects the amount of incident light within its detection range) other than the image capturing device that has captured image 101. For example, the brightness information may be included in log information 100.

The term "similar" as used herein means that the luminance of each image selected in step S70 or the brightness in the image capturing direction during image capture of this image is within a preset predetermined range from the luminance of image 101 or the brightness in the image capturing direction during image capture of image 101. The predetermined range may be stored in advance in storage 35.

Accordingly, in the case where the images selected in step S70 include an image that is similar in luminance or brightness within a predetermined range, this image is preferentially selected. Therefore, it is possible to preferentially select images that are captured in an environment close to the environment when target object 110 has been misdetected. Accordingly, in cases such as where the factors causing misdetection of target image 110 depend on the environment around target object 110, particularly effective training data can be generated.

Figure 11D:
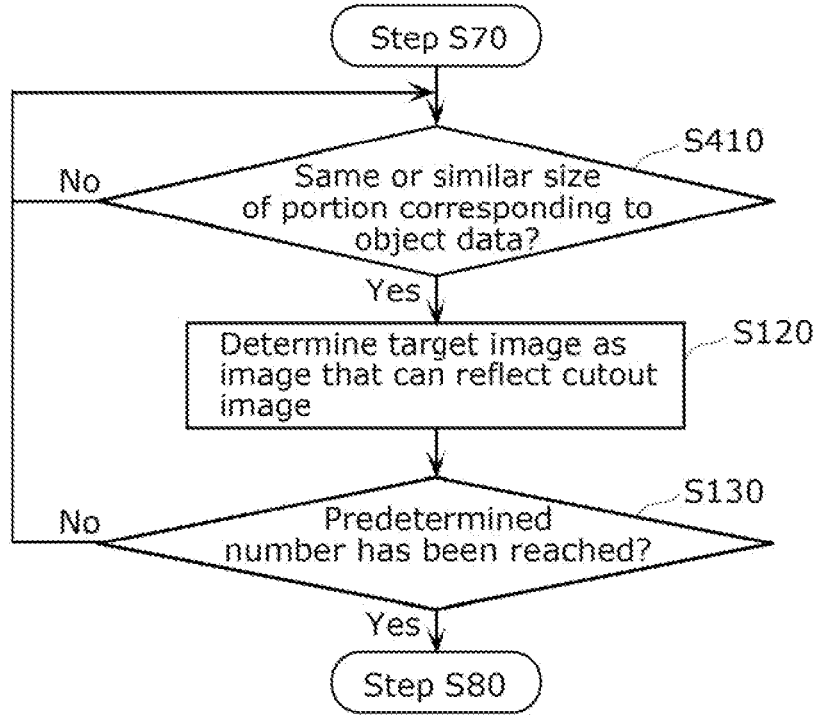
FIG. 11D is a flowchart showing a fourth example of the operations of the generator according to another variation of Embodiment 1.

FIG. 11D is a flowchart showing a fourth example of the operations of generator 34 according to another variation of the present embodiment.

As illustrated in FIG. 11D, generator 34 may further determine, for each of the images selected in step S70, whether or not the sizes of portions (e.g., target objects 110 and 410) corresponding to the object data (e.g., object class) is the same or similar (S410). Specifically, generator 34 determines whether or not the size of target object 110 in image 101 included in log information 100 acquired from mobile unit 10 is the same as or similar to the size of target object 410 in image 401 selected in step S70.

Then, if the size of the portion corresponding to the object data is the same or similar (Yes in S410), generator 34 executes processing in step S120 onward. If the size of the portion corresponding to the object data is neither the same nor similar (No in step S410), generator 34 returns to step S410 and executes the processing in step S410 on the next image.

Note that the size of target object 110 is the size in the image and, for example, the size of target object 110 can be acquired from image 101 included in log information 100. The size of target object 410 can be acquired from image 401.

The term "similar" as used herein means that the size of target object 410 in each image selected in step S70 is within a preset predetermined range from the size of target object 110. The predetermined range may be stored in advance in storage 35.

Accordingly, in the case where the images selected in step S70 include an image that is similar in size to target object 410 within a predetermined range, this image is preferentially selected. Therefore, generator 34 can generate training data that includes a natural image with less discomfort.

Figure 11E:
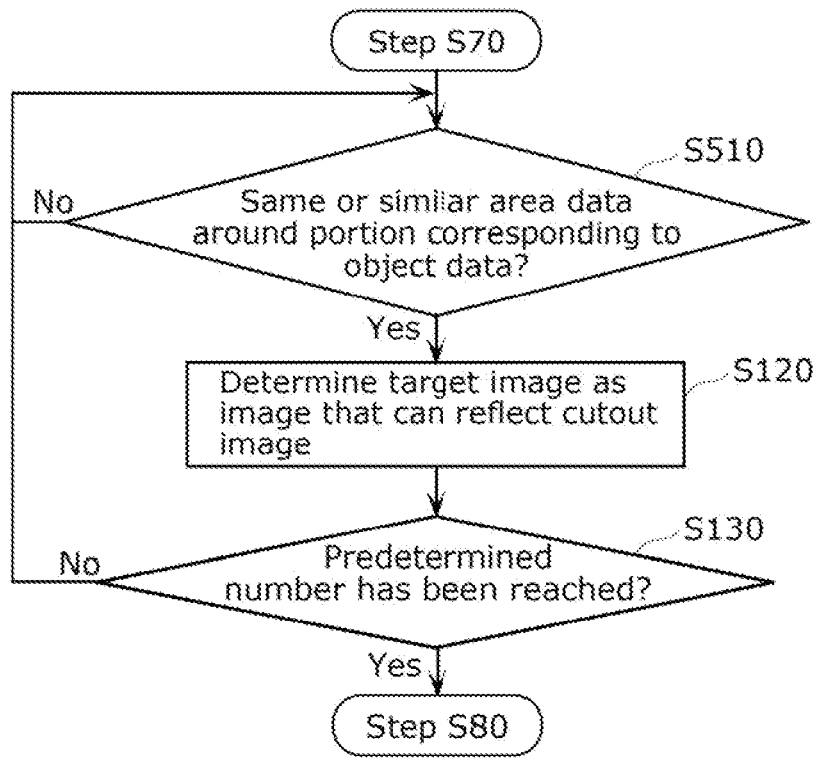
FIG. 11E is a flowchart showing a fifth example of the operations of the generator according to another variation of Embodiment 1.

FIG. 11E is a flowchart showing a fifth example of the operations of generator 34 according to another variation of the present embodiment.

As illustrated in FIG. 11E, generator 34 may further determine, for each of the images selected in step S70, whether or not area data around the portion corresponding to the object data is the same or similar (S510). Specifically, generator 34 determines whether or not segmentation result 300 (see, for example, FIG. 5) for image 101 included in log information 100 acquired from mobile unit 10 is the same as or similar to segmentation result 500 (see, for example, FIG. 8) for each image selected in step S70.

Then, if area data around the portion corresponding to the object data is the same or similar (Yes in S510), generator 34 executes processing in step S120 onward. If the area data around the portion corresponding to the object data is neither the same nor similar (No in step S510) and a predetermined number has not been reached yet (No in S130), generator 34 returns to step S510 and executes the processing in step S510 on the next image.

Note that the area data around the portion corresponding to the object data can be acquired if determination detector 32 is capable of outputting segmentation results. The area data around the portion (target object 110) corresponding to the object data in image 101 is, for example, "roadway" or "forest". The area data around the portion (target object 410) corresponding to the object data in image 401 is, for example, "roadway" or "forest".

The term "similar" as used herein means that the area data around the portion corresponding to the object data in each image selected in step S70 is within a preset predetermined range from the area data around the portion corresponding to the object data in image 101. The predetermined range may be the range of the location or size of area data of the same category (e.g., "roadway" or "forest"). The predetermined range may be stored in advance in storage 35.

Accordingly, in the case where the images selected in step S70 include an image that is similar in area data around the portion corresponding to the object data of the image within a predetermined range, this image is preferentially selected. Therefore, it is possible to preferentially select an image that is captured in an environment close to the environment when target object 110 has been misdetected. Accordingly, in cases such as where the factors causing misdetection of target object 110 depend on the environment around target object 110, particularly effective training data can be generated.

Figure 11F:
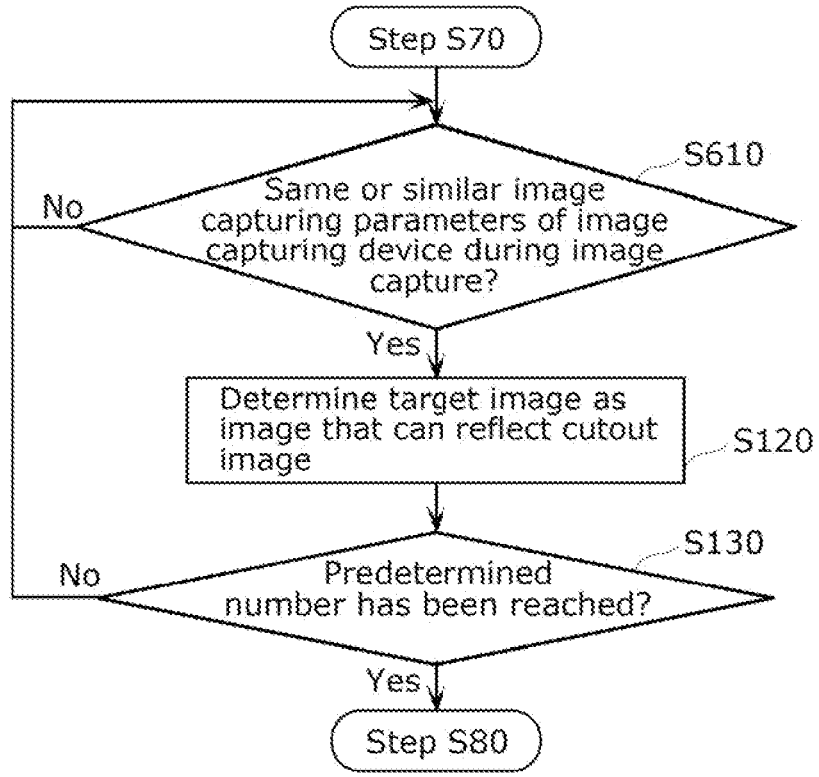
FIG. 11F is a flowchart showing a sixth example of the operations of the generator according to another variation of Embodiment 1.

FIG. 11F is a flowchart showing a sixth example of the operations of generator 34 according to another variation of the present embodiment.

As illustrated in FIG. 11F, generator 34 may further determine, for each of the images selected in step S70, whether or not the image capturing parameters of the image capturing device during image capture is the same or similar (S610). Specifically, generator 34 determines whether or not the image capturing parameters of the image capturing device during image capture of image 101 included in log information 100 acquired from mobile unit 10 is the same as or similar to the image capturing parameters of the image capturing device during image capture of each image selected in step S70.

Then, if the image capturing parameters of the image capturing devices during image capture are the same or similar (Yes in S610), generator 34 executes processing in step S120 onward. If the image capturing parameters of the image capturing devices during image capture are neither the same nor similar (No in step S610) and if a predetermined number has not been reached (No in S130), generator 34 returns to step S610 and executes processing in step S610 on the next image.

Note that the image capturing parameters of an image capturing device during image capture are setting conditions of the image capturing device, and for example, the image capturing parameters of the image capturing device during image capture of image 101 can be acquired from the image capturing parameters included in log information 100. Examples of the image capturing parameters include settings such as gain or white balance, but the present disclosure is not limited thereto.

The term "similar" as used herein means that the image capturing parameters of the image capturing device during image capture of each image selected in step S70 are within a preset predetermined range from the image capturing parameters of the image capturing device during image capture of image 101. The predetermined range may be stored in advance in storage 35.

Accordingly, in the case where the images selected in step S70 include an image that is similar in the image capturing parameters of the image capturing device during image capture, this image is preferentially selected. Therefore, it is possible to generate training data that is similar in environment to the environment when image 101 has been captured, on the basis of information other than the subject (e.g., target object 110). Besides, in cases such as where the factors causing misdetection of target object 110 do not depend on the subject such as target object 110, e.g., when the image capturing parameters become the factors, particularly effective training data can be generated.

Note that processing in two or more steps among the steps S110, S210, S310, S410, S510, and S610 may be executed between steps S70 and S80. The above-described predetermined range may be set for each object class of target object 110 in image 101 included in log information 100.

Alternatively, processing other than that described above may be executed between steps S70 and S80. For example, in the case where there is a scene image that enables superimposition processing with a reduced area where target object 410 lies off image 601, this image may be preferentially selected.

Embodiment 2

A server device and so on according to the present embodiment will be described hereinafter with reference to FIGS. 12 to 15. Note that the server device according to the present embodiment has the same configuration as server device 30 according to Embodiment 1, and therefore a description thereof shall be omitted. Processing that is similar to the processing of server device 30 according to Embodiment 1 may not be described, or may be described in abbreviated form.

The present embodiment describes a case in which object detector 11 has misdetected an object that is not a detection target. The following description is given of the example in which object detector 11 is a detector that detects only "person", FIG. 12 is a flowchart illustrating operations of the server device according to the present embodiment.

As illustrated in FIG. 12, first, server device 30 acquires log information from mobile unit 10 (S1010). Specifically, communicator 31 receives log information from mobile unit 10. Then, communicator 31 outputs the received log information to determination detector 32 and misdetection determiner 33.

Here, the log information received from mobile unit 10, i.e., the log information generated by object detector 11 of mobile unit 10, will be described with reference to FIG. 13. FIG. 13 is a schematic diagram showing one example of log information 800 acquired by server device 30 according to the present embodiment.

As illustrated in FIG. 13, like log information 100, log information 800 includes, for example, a scene image, image-capturing-equipment information, time information, image-capturing-location information, detection information, and image capturing parameters.

As illustrated in the scene image, there are target objects 810 and 820 in image 801. As indicated by the detection information, object detector 11 determines target object 820 that exists in an area surrounded by object area 801a as "person". The object class of target object 820 is "sign". Object detector 11 has misdetected the "sign" that is not supposed to be detected as "person".

Figure 14:
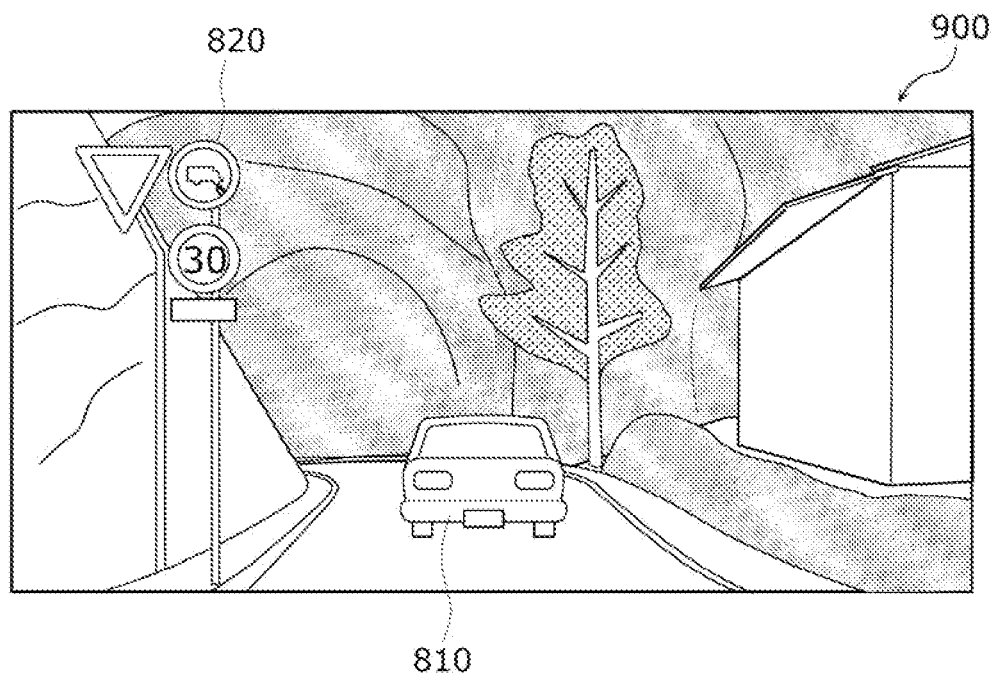
FIG. 14 shows one example of an image that is input to a determination detector according to Embodiment 2.

Referring back to FIG. 12, step S1020 is similar in processing to step S20 illustrated in FIG. 2, and a detailed description thereof shall be omitted, but a segmentation result (see, for example, FIG. 8) is output as a result of inputting image 900 illustrated in FIG. 14 to determination detector 32. FIG. 14 shows one example of image 900 that is input to determination detector 32 according to the present embodiment. Image 900 is assumed to be the same image as image 401. In other words, the segmentation result for image 900 is the same as segmentation result 500 illustrated in FIG. 8. In the following description, the segmentation result for image 900 is assumed to be segmentation result 500.

Misdetection determiner 33 determines whether or not the detection by object detector 11 is misdetection, on the basis of the detection result obtained from determination detector 32 (here, segmentation result 500) and the log information (i.e., the detection result obtained from object detector 11 of mobile unit 10). For example, misdetection determiner 33 determines whether or not there is a difference between the detection result and the log information (specifically, the detection information serving as the object detection result). In the present embodiment, the detection result obtained from determination detector 32 for target object 820 is "sign" (see FIG. 8), whereas the detection result obtained from object detector 11 of mobile unit 10 is "person" (see FIG. 13).

When the detection result obtained from determination detector 32 is different from the detection result obtained from object detector 11 in this way, misdetection determiner 33 determines that the detection by object detector 11 is misdetection. If there is determined to be misdetection (Yes in S1030), misdetection determiner 33 collects log information 800 as misdetected scene data (S1040). Then, misdetection determiner 33 outputs the collected misdetected scene data to generator 34. If there is determined to be no misdetection (No in S1030), misdetection determiner 33 finishes the processing.

Next, generator 34 performs annotation processing on the misdetected scene data acquired from misdetection determiner 33 (S1050). In the present embodiment, since object detector 11 detects only "person," there is no detection category (object class), "sign", in object detector 11. In this case, annotation is generally not performed on that area, but in the present embodiment, annotation is performed to indicate that this area is other than "person", such as "background".

Figure 15:
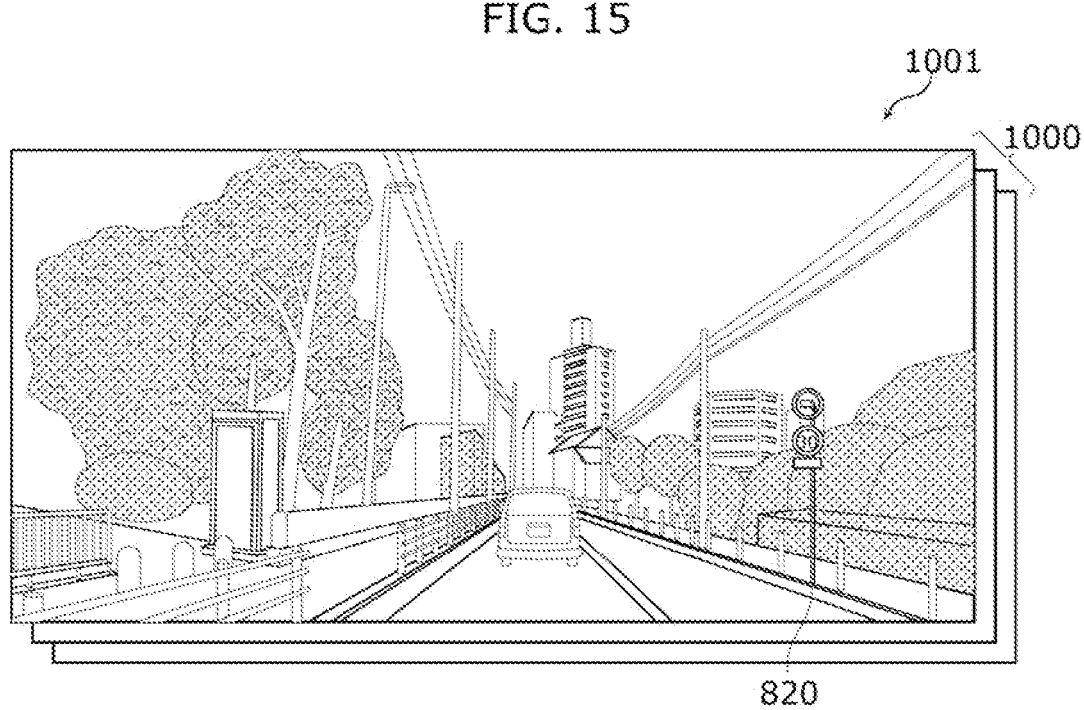
FIG. 15 is a diagram showing one example of an image group included in training data.

Processing in steps S1060 to S1090 is similar to the processing in steps S60 to S90 illustrated in FIG. 2, and therefore a detailed description thereof shall be omitted. Generator 34 generates a cutout image (not shown) obtained by cutting out target object 820 and reflects the generated cutout image in the image (one example of the second image) selected in step S1070 (S1080). In this way, generator 34 generates training data that includes image group 1000 including image 1001 as illustrated in FIG. 15 (S1090). That is, generator 34 generates training data in quantity through the above-described processing. FIG. 15 is a diagram showing one example of image group 1000 included in the training data, By using the detection result obtained from the object detector (e.g., determination detector 32) that includes a larger number of detection categories and performs computation on a larger scale than the object detector (e.g., object detector 11) targeted for relearning, it is possible to more efficiently generate training data in quantity as a workaround to misdetection.

Other Embodiments

Although embodiments and the like according to the present disclosure have been described thus far, the present disclosure is not intended to be limited to the embodiments and the like described above.

For example, although the above-descried embodiments and the like have described the example in which the mobile unit is an automobile (self-driving vehicle), the present disclosure is not limited thereto. The present disclosure is applicable as long as a mobile unit includes an object detector (object detection device). The mobile unit may, for example, be an air vehicle (e.g., a drone) or a marine structure, or may be a robot (e.g., a free-running vacuum cleaner) that autonomously moves in accordance with captured images of the surroundings. In other words, the server device (training data set generator) according to the present disclosure is applicable not only in the field of self-driving vehicles but also in the field of different products such as robots and drones.

The object detector of the mobile unit according to the above-described embodiments may be configured to be capable of outputting a segmentation result as a detection result.

The sequence of a plurality of processes described in the above embodiments is merely one example. The sequence of a plurality of processes may be changed, or these processes may be executed in parallel.

Each constituent element described in each Embodiment may be implemented as software, or may be implemented typically as an LSI serving as an integrated circuit. These constituent elements may be individually formed into a single chip, or some or all of the constituent elements may be formed into a single chip. Although an LSI is described here as an example, it may also be referred to as an IC, a system LSI, a super LSI, or an ultra LSI depending on the degree of integration. The method of circuit integration is not limited to LSI, and may be implemented by using a dedicated circuit or a general-purpose processor. A field programmable gate array (FPGA) that enables programming after the manufacture of LSI, or a reconfigurable processor capable of reconfiguring connections and settings of circuit cells inside an LSI may be used. Moreover, if other circuit integration techniques that replace LSIs make their debuts with the advance of semiconductor technology or with derivation from another technology, such techniques may be used to integrate the constituent elements into an integrated circuit.

The way of division of functional blocks in the block diagrams is merely one example, and a plurality of functional blocks may be implemented as a single functional block, or one functional block may be divided into a plurality of functional blocks, or some functions may be transferred to a different functional block. The functions of a plurality of functional blocks having similar functions may be processed in parallel or in time sequence by single hardware or software.

The server device included in the information processing system may be implemented as a single device, or may be implemented as a plurality of devices. For example, each processing unit of the server device may be implemented as two or more server devices. In the case where the information processing system is implemented as a plurality of server devices, the constituent elements of the information processing system may be divided in any way into the server devices. There are no particular limitations on the method of communication among a plurality of server devices.

Moreover, the technique disclosed in the present disclosure may be the program described above, or may be a non-transitory computer-readable recording medium that records the program described above. It goes without saying that the program described above may be distributed via a transmission medium such as the Internet. For example, the program described above and digital signals formed by the program described above may be transmitted via an electric communication line, a wireless or wired communication line, a network typified by the Internet, or data broadcastings. The program described above and digital signals formed by the program described above may be implemented as an independent different computer system by being recorded and transferred on a recording medium or by being transferred via a network or other systems.

INDUSTRIAL APPLICABILITY

The present disclosure is applicable to, for example, an information processing method of generating training data used in relearning of a trained model.

The invention claimed is:

1. An information processing method, comprising the following executed by a computer:
   acquiring a first image and object data of an object appearing in the first image;
   extracting a portion of the first image that corresponds to a difference between the object data and an object detection result obtained by inputting the first image to a trained model, the trained model receiving an image as input to output an object detection result;
   acquiring, from an image group acquired in advance, a second image including a portion that corresponds to same object data as object data corresponding to the portion of the first image extracted; and
   generating training data for the trained model by reflecting an image based on the portion of the first image extracted, in the portion of the second image acquired and corresponding to the same object data.

2. The information processing method according to claim 1, further comprising the following executed by the computer:
   acquiring the object detection result and comparing the object detection result acquired with the object data; and
   extracting the portion of the first image in accordance with a comparison result.

3. The information processing method according to claim 1,
   wherein the image based on the portion of the first image is an image obtained by processing the portion of the first image.

4. The information processing method according to claim 1,
   wherein the image based on the portion of the first image is an image similar to the portion of the first image and selected from images prepared in advance.

5. The information processing method according to claim 1,
   wherein the acquiring of the second image includes acquiring, as the second image, an image that is captured by an image capturing device whose location or orientation is same as or similar to a location or orientation of the image capturing device that captures the first image.

6. The information processing method according to claim 1,
   wherein the acquiring of the second image includes acquiring, as the second image, an image that is captured in same or similar time period or weather as or to a time period or weather when the first image is captured.

7. The information processing method according to claim 1,
wherein the acquiring of the second image includes acquiring, as the second image, an image that is captured with same or similar luminance or brightness in an image capturing direction as or to luminance or brightness in an image capturing direction when the first image is captured.

8. The information processing method according to claim 1,
wherein the acquiring of the second image includes acquiring, as the second image, an image in which a size of a portion corresponds to the same object data as object data corresponding to the portion of the first image is same as or similar to a size of the portion of the first image.

9. The information processing method according to claim 1,
wherein the acquiring of the second image includes acquiring, as the second image, an image whose area data around a portion corresponding to same object data as object data corresponding to the portion of the first image is same as or similar to area data around the portion of the first image.

10. The information processing method according to claim 1,
wherein the first image and the second image are captured images, and
the acquiring of the second image includes acquiring, as the second image, an image that is captured by an image capturing device whose image capturing parameter is same as or similar to an image capturing parameter of an image capturing device that captures the first image.

11. An information processing system, comprising:
an acquirer that acquires a first image and object data of an object appearing in the first image; and
a generator that generates training data for a trained model by extracting a portion of the first image that corresponds to a difference between the object data and an object detection result obtained by inputting the first image to the trained model, acquiring, from an image group acquired in advance, a second image that includes a portion corresponding to same object data as object data corresponding to the portion of the first image extracted, and reflecting an image based on the portion of the first image extracted in a portion of the second image acquired that corresponds to the same object data, the trained model receiving an image as input to output an object detection result.

* * * * *